United States Patent [19]

Thiel

[11] 4,106,717
[45] Aug. 15, 1978

[54] LATCHING MEANS FOR A FREE SPOOL RETRIEVAL AND SPIN TYPE CASTING REEL

[76] Inventor: Ralph Thiel, 1129 Wanda Ave., Seaside, Calif. 93955

[21] Appl. No.: 711,432

[22] Filed: Aug. 4, 1976

[51] Int. Cl.² .................... A01K 89/015; A01K 89/02
[52] U.S. Cl. .................. 242/84.2 B; 242/213; 242/220; 242/84.53
[58] Field of Search ............... 242/84.2 B, 211, 212, 242/213, 214, 215, 216, 217, 219, 220, 84.51 R, 84.2

[56] References Cited

U.S. PATENT DOCUMENTS

| | | | |
|---|---|---|---|
| 1,114,084 | 10/1914 | Wells | 242/84.2 B |
| 2,515,896 | 7/1950 | Rakoczy | 242/84.53 X |
| 2,564,975 | 8/1951 | Holm | 242/84.51 R |
| 2,573,240 | 10/1951 | Berlinger | 242/212 |
| 2,614,767 | 10/1952 | Dean | 242/84.2 B |
| 2,896,876 | 7/1959 | Bogar | 242/84.2 B X |
| 3,727,857 | 4/1973 | Chann | 242/84.2 B |

FOREIGN PATENT DOCUMENTS 1,324,325  3/1963  France ................. 242/84.2 B

*Primary Examiner*—Billy S. Taylor
*Attorney, Agent, or Firm*—Leslie M. Hansen

[57] ABSTRACT

A turntable pole mount for a fishing reel for converting the spool thereof from a fixed disposition on a drive shaft parallel to a fishing pole during spin type casting of a fishline into a free spool disposition on the shaft turned to a transverse disposition on the fishing pole and the spool in driving engagement with the hand crank operated gear arrangement of the reel for normal free spool retrieval of the fishline on the spool; together with a spring loaded thumb actuated lever pivotally mounted on the pole mount for normally latchingly securing the turntable in either of its two limits of movement; and for applying a braking action to the spool when it is disposed in spin casting position and the thumb actuated lever is depressed during spin casting of a fishline from the reel.

3 Claims, 10 Drawing Figures

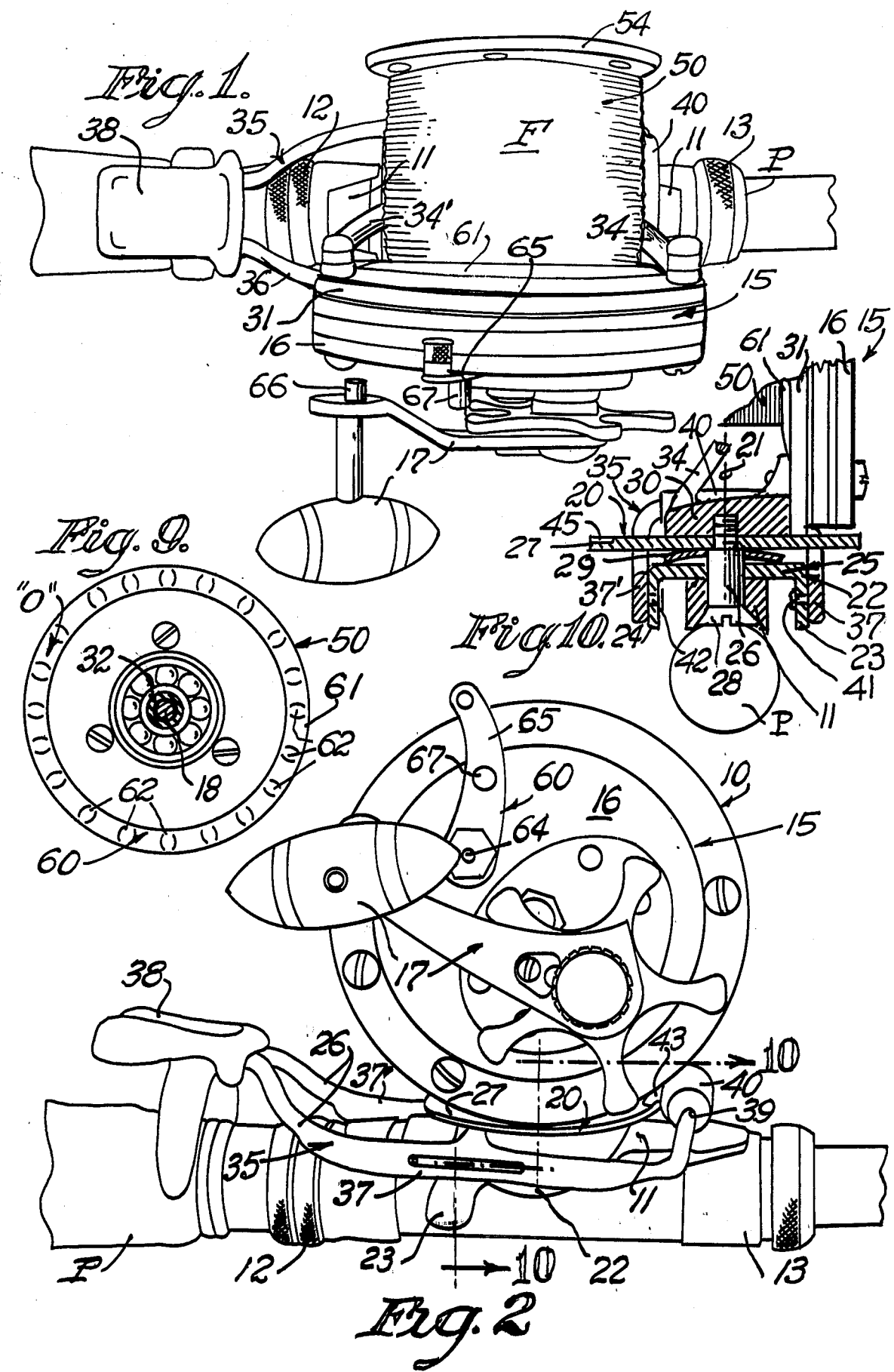

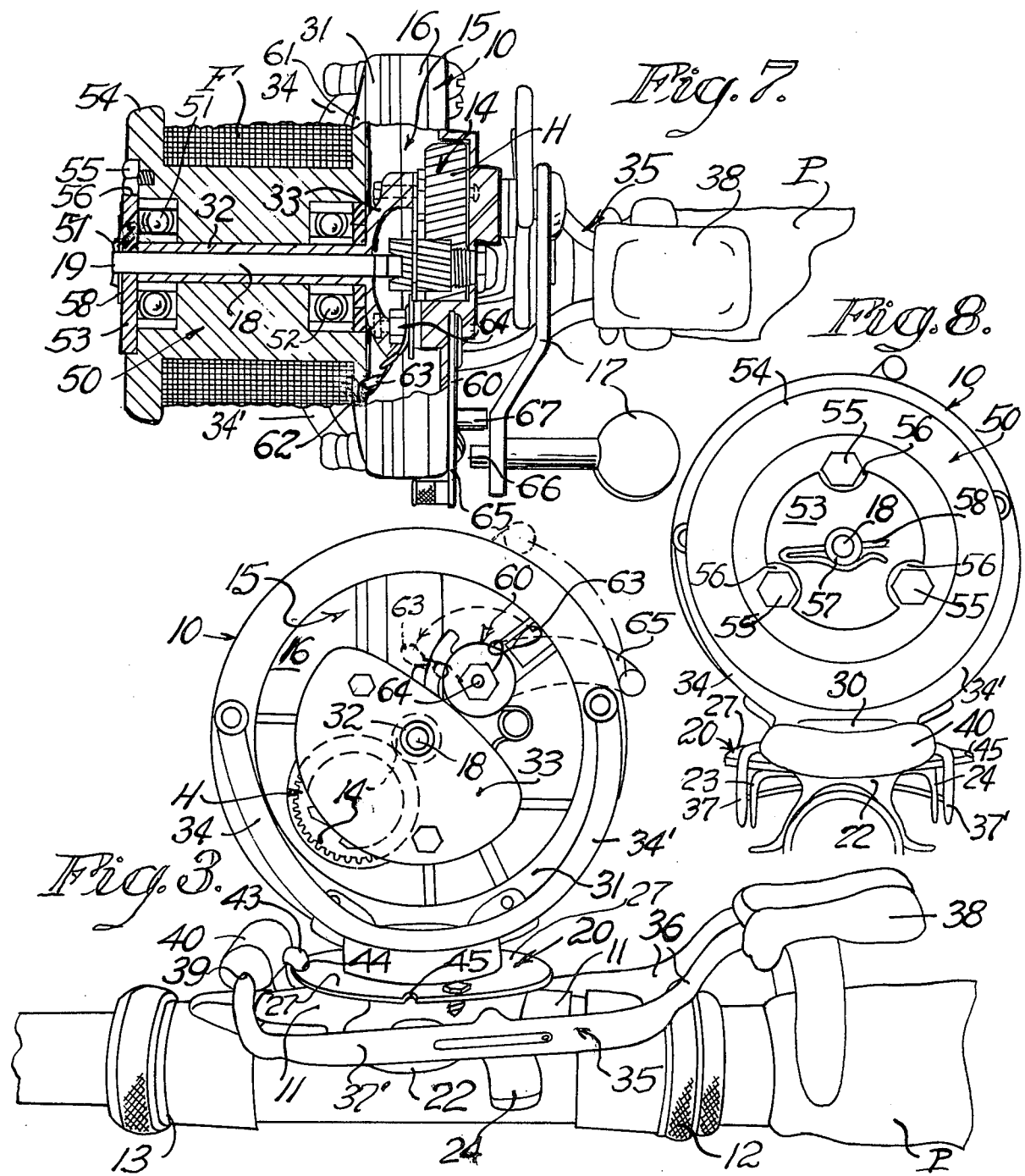

LATCHING MEANS FOR A FREE SPOOL RETRIEVAL AND SPIN TYPE CASTING REEL

This invention relates to fishing reels and more particularly to a Combination spin-type casting reel and a free spool line retrieval reel.

BACKGROUND

For many years, the only reel known in the angling art of casting a baited fishline was what is commonly referred to as a free spool reel. Briefly this is an instrument embodying a spool mounted on a shaft disposed normal to the axis of the fishing pole upon which the reel is secured. The spool was free to turn during casting allowing the fishline to pay out therefrom dependent upon the weight and momentum of the bait and the like at the free end of the fishline. Its greatest fault was the occurence of a backlash due to failure of the angler to keep the line taut. In other words, any slack in the line as the reel was turning in a payout direction due to the initial thrust and; momentum created, caused the loose line to wind back upon the free turning reel resulting in an ultimate tangle of the line on the reel.

To overcome such backlashing of the line, an angler had to become adept at thumbing the reel as it paid out line to prevent any slack in the fishline. Later some reels were provided with a brakelike drag to prevent slack in the line or overriding thereof relative to the out paying reel. Nevertheless it still called for skill while handling the reel and much casting distance was lost due to the added drag.

For retrieving the fishline, the free spool reel is connectable by a clutch or gear arrangement to a hand crank for rewinding the line back upon the reel.

Later in the angling art of line casting there was developed what is known as a spinning reel. In the spinning reel device, the spool is stationary and has its axis disposed parallel to the axis of the pole and open ended outwardly of the pole upon which the reel is secured. A crank handle is arranged on the device to turn on an axis at right angles to the spool and pole. During casting of the fishline from a spinning reel the line pays out freely from the open end of the spool substantially parallel to its axis and out through grommets on the pole. This in effect minimized and eliminated the backlash fault of prior known free spool reels and has made casting more pleasing and pleasureful for the angler.

To retrieve the fishline on the spool of a spin type reel a wire bale or hook is drivingly connected to the crank handle. The wire bale is disposed to turn in an orbit about the periphery of the fixed spool by manual operation of the hand crank, to rewind the fishline upon the spool. However on retrieval, i.e., reeling in the fishline, a problem does occur due to the requirement that the incoming line being substantially parallel to the pole and reel shaft, it must be fed at a right angle onto the spool, i.e., 90° with the respect to the axis of the spool. To accomplish this, the spinning reel device must have the wire bale or steel hook arranged radially outward from the spool to train the line about an orbital path and make it approach the spool from one side of the periphery thereof. This means that the incoming fishline must bear hard at a sharp right angle as it turns over the orbiting steel bale or hook. This gyration of the fishline as it bears hard upon the bale or hook, tends to put a twist on the line; cause it to wear; become flattened out of its normal round configuration; and most importantly puts a resistive load on the manipulation of the hand crank by which the wire bale is being turned during retrieval.

The present invention seeks to eliminate the faults of both the free spool and the fixed spool of a spinning reel while retaining the advantages of both in a common structure.

STATEMENT OF THE INVENTION

It is an object of the present invention to provide a spin-cast reel adapted to pay out fishline in a direction substantially parallel to the axis of the spool and pole and to retrieve the line directly onto the spool straight from the pole as in a free turning spool reel. In this connection it is an object of the invention to provide a reel mount between the pole and the reel for instantly converting the spool from that of a spin-cast reel into that of a free spool retrieval reel in a simple yet effective manner.

It is another object of this invention to provide a pole mount with turntable arrangement for supporting the spool of a spin type casting reel on the pole and means for latching the turntable arrangement so that the spool of the reel may have its axis parallel to the pole during casting or transversely thereof during retrieval as desired and/or required. In order to accomplish this object, the reel of the present invention comprises a free floating spool mount having one end only secured to a housing supported on the turntable arrangement so as to afford movement of the spool between a disposition for either casting and/or the retrieval functions of the spool and reel.

It is another object to provide a convertible spin cast reel with a turntable pole mount or carriage for the housing in which a hand operated gear arrangement of the reel is confined and having a fixed free ended driveshaft extending therefrom for movement between a disposition either parallel or transverse to the axis of a fishing pole upon which the turntable pole mount is secured.

It is another object to provide a sleeve-shaft concentric to and confining the drive-shaft as a free floating axle fixed to and extending from the gear housing to take-up spool load and afford ball bearing turning of the spool upon the fixed sleeve shaft and to provide means for connecting the spool to the free end of the drive shaft for driving relation thereto only.

It is yet another object to provide such a convertible spin cast reel with interchangeble spools each adapted to be journaled on the fixed sleeve shaft and drive connection to the free ended drive shaft for driving engagement with the gear arrangement of the reel for free turning by the manipulation of the hand crank thereof.

It is still another object to provide such a convertible spin cast reel with a spring loaded thumb actuated lever pivotally mounted on the pole mount and having one end provided with a tooth disposed to engage stop elements on the turntable for latching the same in either of its limits of movement in which the shaft and spool thereon has its axis parallel or transverse with respect to the axis of a fishing pole and pole mount.

It is a still further object of this invention to provide the free floating spool on the shaft of the reel with an end ring and a brake shoe on the thumb actuated lever for engaging such end ring to resist turning of the spool and to secure the line preparatory to casting until the thumb actuated lever is released for the final line cast.

It is another object of this invention to provide the housing for the hand crank operated gear arrangement with an exteriorly controlled lever for setting a clicker mechanism in engagement with the free floating spool to retard its turning movement upon the shaft and for automatically releasing such clicker lever by manual turning of the crank handle of the reel.

These and other objects and advantages of the present invention will become more apparent from a reading of the following description and claims in the light of the accompanying three sheets of drawing.

FIG. 1 is a top view of the reel of the present invention mounted on the handle end of a fishing pole in free spool retrieval disposition;

FIG. 2 is a side elevation of the reel seen from below in FIG. 1;

FIG. 3 is a side view of the reel as seen from the opposite side of FIG. 2 with the spool of the reel removed for purpose of illustration;

FIG. 6 is a side elevation of the reel shown in spin casting position at reduced scale;

FIG. 7 is a horizontal section through the spool and part of the gear housing as taken along line 7—7 in FIG. 6;

FIG. 8 is an end view of the spool and reel mount as seen substantially from line 8—8 in FIG. 6; and FIG. 9 is an end view of the spool removed from the reel shaft to show the gear and clicker indentations on the inner face of the spool.

FIG. 10 is a fragmentary cross section through the pole mount, turntable and thumb actuated control of FIG. 5, and taken substantially along line 10—10 in FIG. 2.

GENERAL DESCRIPTION

Figure 5:
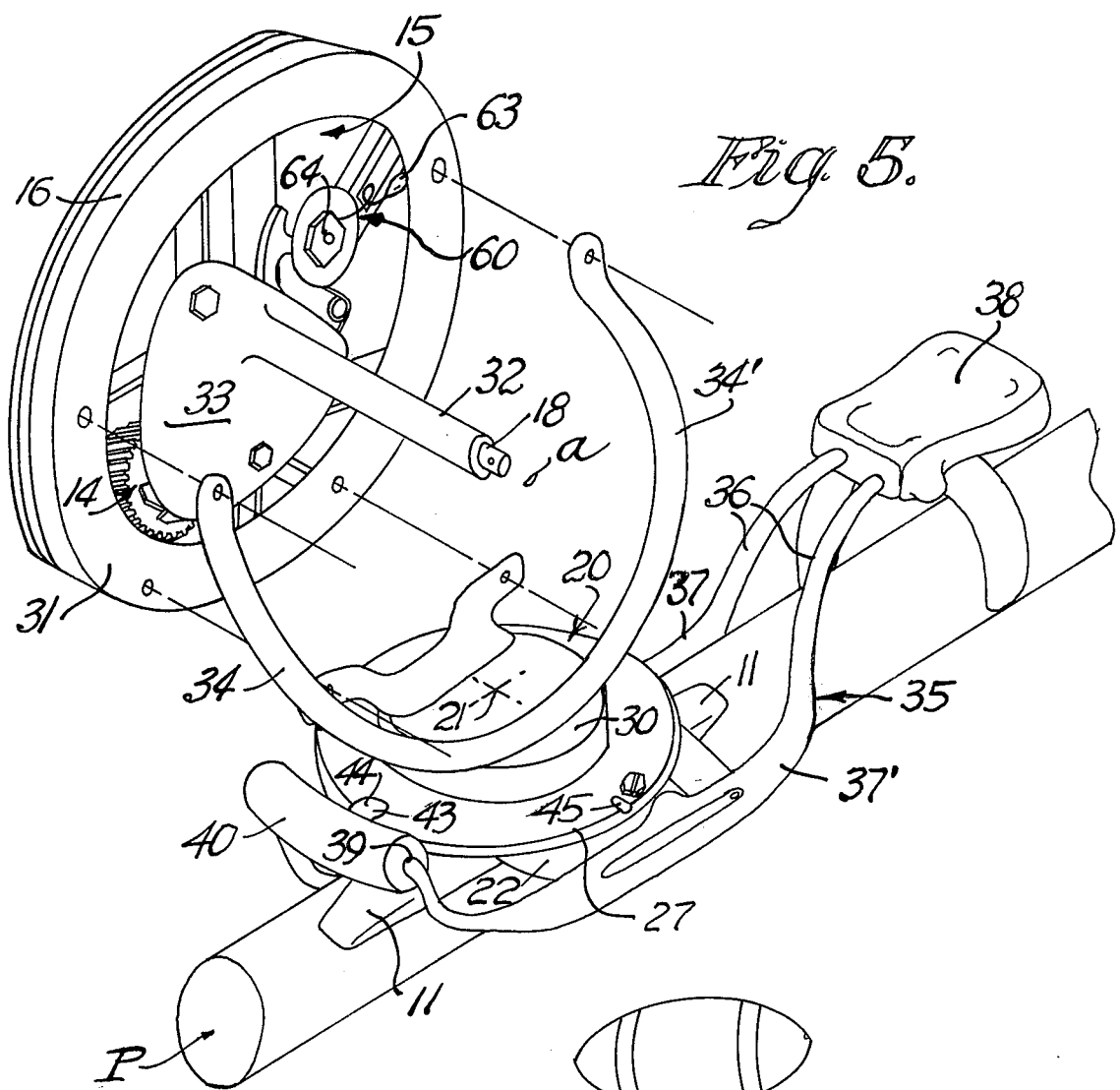
FIG. 5 is a perspective view of the turntable arrangement, pole mount and thumb actuated control with the gear housing removed in exploded perspective.

In the drawings a fishing reel generally designated 10 is shown supported on a conventional pole mount 11 having tapered ends adapted to fit the contour of a fishing pole P and to be detachably secured thereto at its ends by the usual metal screw ring holders 12 and 13 on the handle end of the fishing pole P.

The reel 10 includes a drive mechanism 14 within a housing 15 upon one exterior wall 16 of which a crank handle 17 is mounted for manually operating the gear mechanism 14. The handle 17 of the drive mechanism 14 is adapted to be operatively connected by a gear operated drive-shaft 18 extending from the housing 15 for driving a spool 50 upon which a fishline F is to be wound.

Although the foregoing elements of a fishing reel are of general and conventional nature, it is the purpose of this invention to provide a convertible reel for spin type casting and free spool retrieval in a manner now to be described.

DETAILED DESCRIPTION OF THE INVENTION

The convertible reel of the present invention includes a turntable arrangement 20 pivotally mounted as a 21 on the pole mount 11 of the reel 10.

The turntable arrangement 20 comprises a lower floor plate 22 welded to the pole mount 11. The floor plate 22 is an elongated U shaped member inverted so as to provide side flanges 23 and 24 adapted to embrace the pole mount 11 and the pole P when the latter is secured thereto. The web portion 25 of the floor plate is disposed substantially tangent to the pole P and has a bored hole formed through the plate 25 and the pole mount for a receiving stud bolt 26 at the pivotal axis 21 of the turntable arrangement 20.

A disc 27 is mounted on the web 25 of the top plate 22 upon the stud bolt 26 to provide the turntable element of the turntable. The stud bolt 26 has a head 28 and extends upwardly through the pole mount 11, web 25 and disc 27. The head 28 of bolt 26 fits a countersunk recess in the pole mount 11 and has a threaded end above the disc 27 upon which a spring washer 29 and nut 30 are arranged. By this arrangement the disc 27 is adapted to turn about the pivotal axis 21 upon the stud bolt 26, the spring washer 29 tending to retard free rotation but allowing turnability of the disc 27.

The housing 15 of the drive mechanism 14 has one side open and framed by a side ring 31 of the housing. This side ring 31 is mounted on the disc 27 for movement therewith. As seen in FIG. 10, the side ring 31 has its lower peripheral edge in tangent engagement with the top surface of the disc 27 adjacent the periphery of the latter. The ring 31 is welded or otherwise firmly secured to the disc 27 at right angles thereto so that a centerline-a-extended axially from the ring 31 and housing 15 is diametrically disposed above the disc 27.

A sleeve-shaft 32 having one end secured to the housing 15 congruent to the centerline-a-thus overlies the disc 27 and traverses the pivotal axis 21 of the turntable extended vertically from the stud bolt 26. The right angle arrangement of the disc 27 and sidering 31 of the housing 15, is reinforced by a pair of side braces 34 and 34′ each having its lower end welded to the disc 27 and its opposite end secured by headed bolts to the vertical face of the side ring 31 of the drive mechaniam housing 15.

The turntable disc 27 is arranged to turn between two positions of movement, i.e., spin casting position and free spool retrieving position, which are at 90° relative to each other. A spring loaded thumb actuated lever 35 mounted on the top plate 22 of the turntable arrangement 20 serves to limit and release the disc 27 in its movement between the two positions of adjustment.

The thumb actuated lever 35 is shown as a frame 36 having a pair of parallel side arms 37 and 37′ joined at one end by a thumb button or pad 38 and at its opposite end by a cross bar 39 upon which a brake shoe 40 is mounted. The side arms 37 and 37′ are spaced to lie outside and adjacent the side flanges 23 and 24 of the inverted U shaped floor plate 22. The side arms 37 and 37′ are pivotally mounted on the flanged 23 and 24 by inwardly directed pivot pins 41 and 42, respectively, extending into aligned bores formed in the side flanges 23 and 24.

A locking tooth 43 is formed centrally and integrally of the cross bar 39 is disposed to extend downwardly against the upper surface of the disc 27 by action of the spring load upon the lever 35. Depressions or holes 44 and 45 formed in the disc 27 to receive the locking tooth 43. The depression and the hole 44-45 are disposed at 90° with respect to each other as a seat for the lower end of the locking tooth 43. The thumb actuated lever 35 being disposed parallel to the fishing pole P, the seats 44 and 45 for the locking tooth are oriented on the disc 27 such that one of the seats 44 is vertically below the extreme end 46 of the sleeve-shaft 32 and the other seat shaft 45 is disposed 90° clockwise therefrom as seen from above in FIG. 5. Consequently, when the locking tooth 43 is seated in the depression 44 the shaft 32 of the reel is parallel to the fishing pole P and pole mount 11 as seen in FIGS. 6 and 7. Conversely, when the locking tooth 43 is seated in the hole 45, the shaft 32 is transverse to the pole P and pole mount 11 and the drive mechanism 14 is to the right of the pole P. FIGS. 2 and 3.

A spool 50 is mounted for free turning movement upon the sleeveshaft 32 for turntable movement therewith between the two position of adjustment. As shown in the section FIG. 7 the spool 50 preferably has ball bearings 51 and 52 at its ends to reduce frictional load upon the extended sleeve-shaft 32 and torque against the spool and the sleeve-shaft housing 15 from which it extends. The spool 50 is maintained upon the free ended shaft 32 by any suitable removable, securing means, as shown in section in FIG. 7. It should here be noted that different spools such as the one 50 having various test fishlines thereon are interchangeably mountable on the shaft 32.

Figure 4:
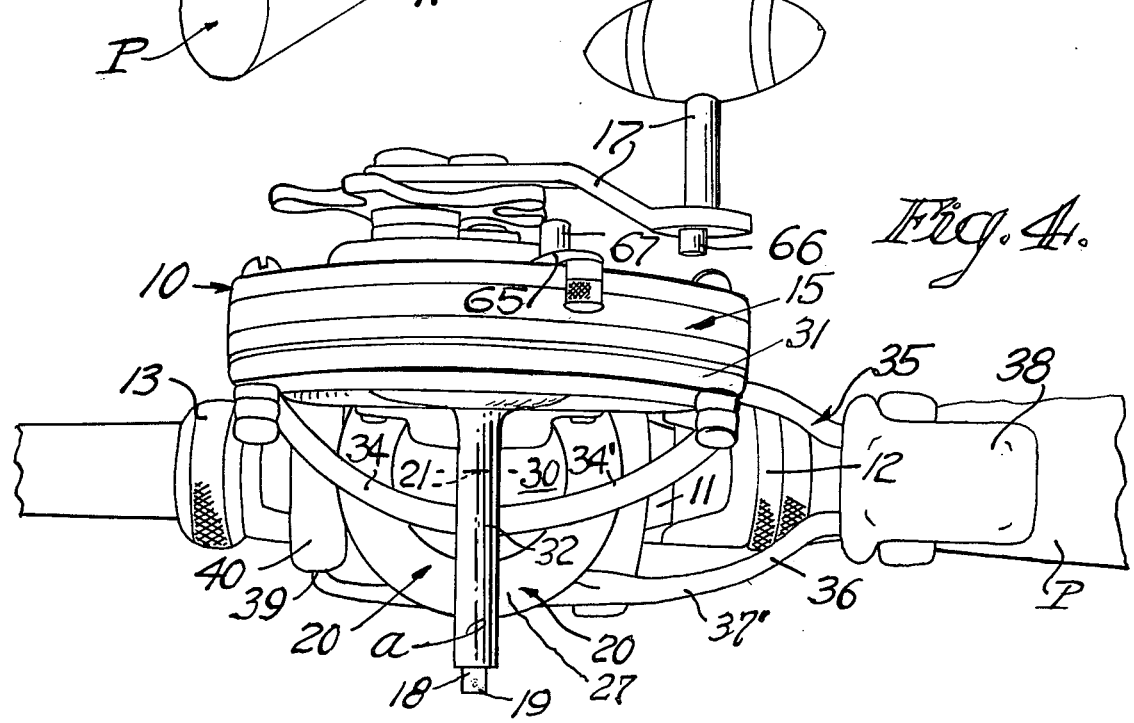
FIG. 4 is a top plan view of FIG. 3.

As best seen in FIGS. 3 and 4 the sleeve-shaft 32 has its inner end welded to and projecting from an internal bridge plate 33 fixed within the housing 15. The bridge plate 33 overlies the gear mechanism 14 such that the gear H connected to the shaft of the handle 17 can mesh with a reduced gear on the drive shaft 18 of the reel. The drive shaft 18 thus extends through and concentrically of the sleeve shaft 32 and slightly beyond the outer end of the latter as seen in FIG. 7. This arrangement is defined as a free floating axle in which no load is put upon the drive shaft 18 except that of rewinding the reel spool.

In the present disclosure the spool 50 is drivingly connected to the drive shaft 18 by a locking washer 53 keyed to the outer rim end 54 of the spool as shown in FIGS. 7 and 8. It is there shown that the spool end 54 has a plurality of knobs 55 equally spaced in annular array. These knobs fit into recesses 56 formed on the locking washer 53 for keyed connection thereto. The washer 53 has a hub 57 on the extended end 19 of the drive shaft 18. A cotter pin 58 extends through aligned bores formed through the hub 57 and extended end 19 of the drive shaft 18 for retaining the spool 50 on the sleeve-shaft 32 as well as for drivingly connecting the locking washer 53 to the drive shaft 18.

By the foregoing arrangement the spool 50 is mounted for free turning movement upon the fixed sleeve shaft 32 and in direct driving relation with the free floating axle or the drive shaft 18, gear mechanism 14 and hand crank 17 on the reel housing 15. In this manner the fixed sleeve shaft housing carry all the load, torque or pull exerted upon the spool during reeling in of the fishline and the free floating axle-drive shaft merely turns the spool upon the sleeve shaft.

The free turnability of the spool 50 is deterred by a clicker mechanism 60 between the spool and housing 15. The inner face of the inner rim 61 of the spool 50 has a plurality of hemispherical indentations 62 formed thereon in annular array as shown in FIG. 9. These indentations 62 are disposed in an orbital path —o— (FIG. 3) which lies adjacent the periphery of the inner side rim 61 for engagement by a spring loaded bead 63 of the clicker mechanism 60. The spring loaded clicker bead 63 is mounted on a turnbolt 64 pivotally mounted on and extending through the side wall 16 of the housing 15. The turnbolt is key connected to a lever 65 exteriorly of the wall 16 for hand adjustment into "on" and "off" positions. In FIGS. 1 and 2 the lever is shown in "off" position, whereas the lever 65 is shown in "on" position in FIGS. 3 and 6 wherein the clicker bead 63 is disposed in the orbital path of the clicker indentations 62 on the rim 61 when the spool 50 is mounted on the reel.

The clicker mechanism 60 is most useful after the spin cast when the spool of the reel is disposed transverse to the pole P and fishline paid out. With the clicker mechanism 60 in "on" position, the person using the fishing reel is alerted to any outward pull on the line by the clicking noise as the spring loaded bead 63 skips between indentations on the inner wall 61 of the spool. However, the minute the fisherman begins to turn the hand crank 17 to reel in the line a pine 66 mounted on the crank handle, FIGS. 1 and 4, cammingly engages a similar pin 67 on the clicker lever 65. The pivot mount of lever 65 on its turn bolt 64 being offset from that of the crank handle 17 causes the lever 65 to be swung into "off" position automatically. This returns the clicker bead 63 to an "off" clicker disposition dotted lines FIG. 3, out of the orbit —o— of the clicker indentations 62 on the spool 50. The spool 50 thus becomes a free turning spool for reeling in, i.e., retrieving the cast our portion of the fishline.

After the fishline is retrieved on the spool 50, the thumb actuated lever 35 is manipulated to release the turntable arrangement 20 and the reel housing turned to dispose the spool and shaft 32 parallel to the pole P. The clicker mechanism 60 is again set into "of" condition by manually turning its lever 65 into "on" position FIG. 3. This retards free turning of the spool 50 as previously explained. With a leader end of the fishline freely suspended from the free end of the pole, the thumb actuated lever 35 is again manipulated to cause the brake shoe end 40 to bear tightly against the periphery of the outer rim 54 of the spool 50. This stops the fishline from circumventing the free end, outer rim 54 of the spool during whip action of the pole by the fisherman. When the pole p is whipped out to about a 10 o'clock angle and the thumb pad 38 on lever 35 released, the fishline can now pass out over the free end rim 54 of the spool allowing the line to pay out to complete the spin type cast.

Once the spin cast is complete with baited line paid out, the thumb actuated lever may be used to hold the fishline against further payout. It is also used to release the turntable arrangement to allow the fisherman to convert the reel to a free spool retrieval reel when the line is to be rewound upon the spool.

While I have described my new Combination Freespool and Spin Type Fishing Reel in specific detail it will be appreciated by those skilled in the art that the same may be varied, altered and/or modified without departing from the spirit of my invention therein. I therefore desire to avail myself of all variations, alterations and/or modifications as may fairly come within the purview of the appended claims.

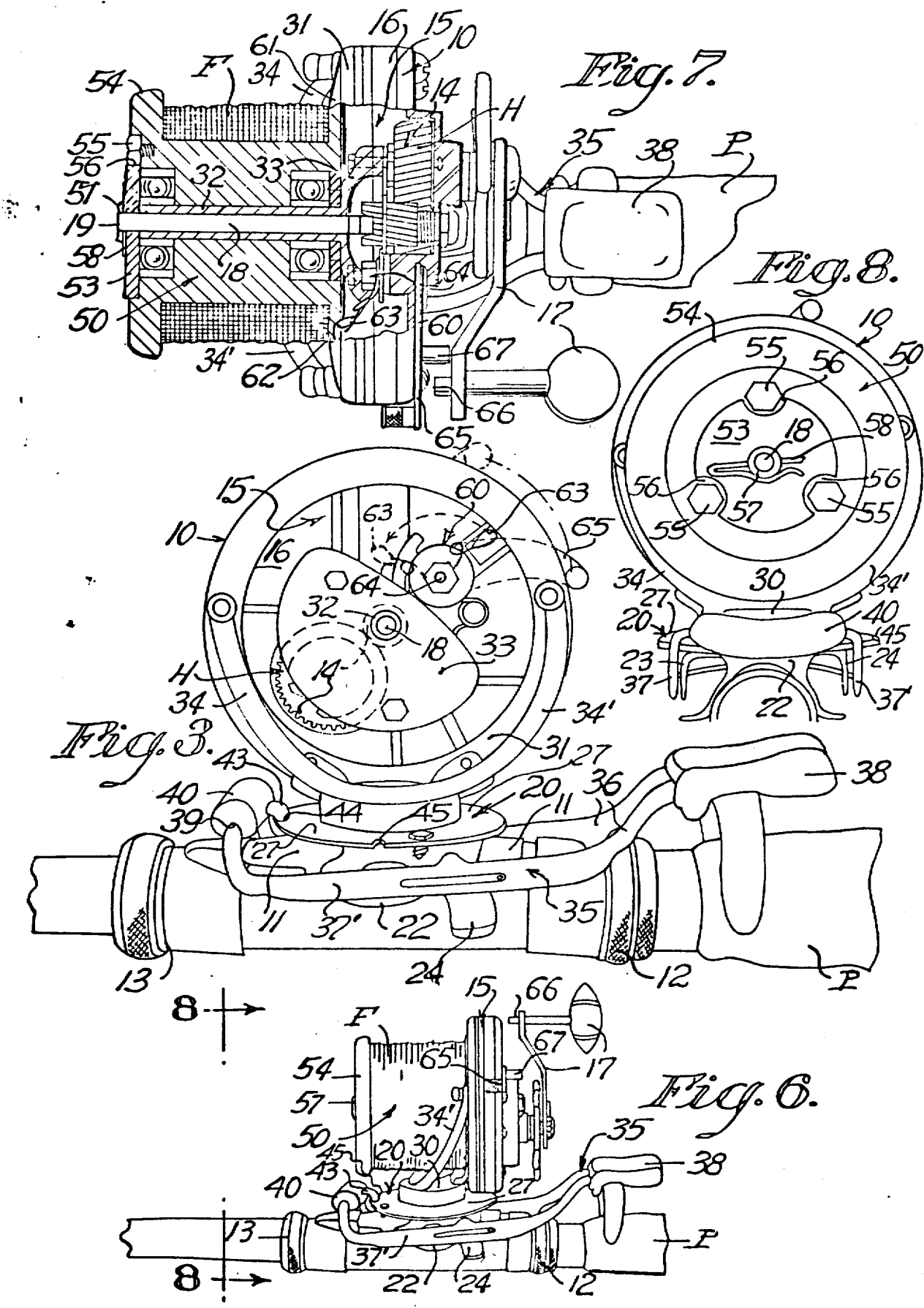

I claim:

1. A fishing reel for use of a fishing pole said reel being convertable from a fixed spool casting reel to a free spool retrieval reel comprising in combination:
   (1) a pole mount;
   (2) a turntable pivotally secured to said pole mount;
   (3) a gear housing secured to said turntable radially of the pivotal center thereof;
   (4) a gear arrangement within said housing;

(5) means on said gear housing for turning said gear arrangement;

(6) a sleeve shaft having one end secured to said gear housing and extending therefrom radially of and above said pivotally mounted turntable;

(7) a spool journaled for free rotation on said sleeve shaft;

(8) a drive shaft journaled as a free floating axle within said sleeve shaft and adapted to have drive connection with said gear arrangement within said gear housing;

(9) means at the free end of said drive shaft for connecting the latter to said spool;

(10) stop means on said turntable at right angles relative to each other, one below the free end of said drive shaft diametrically opposite said gear housing and the other at 90° therefrom;

(11) a thumb actuated lever pivotally mounted on said pole mount on an axis transverse of the pole;

(12) a thumb depressable pad on one end of said thumb actuated lever overlying the pole;

(13) a tooth member on the opposite end of said thumb actuated lever adapted to engage said stop means on said turntable for limiting rotative movement of said turntable between a spin casting position with said sleeve shaft extending parallel to said pole and a reel retrieval position with said sleeve shaft transverse to said pole; and

(14) a brake shoe on opposite end of said thumb actuated lever adapted to engage said spool when said sleeve shaft is disposed in spin casting position and the thumb pad depressed during spin casting of the fish line from the spool.

2. A convertable fishing reel in accordance with that of claim 1 in which said spool includes an outer rim and said brake means comprises a cross bar on said thumb actuated lever opposite the thumb depressable end thereof; and a brake shoe on said cross bar disposed to engage the periphery of the outer rim on said spool.

3. A convertable fishing reel in accordance with that of claim 1 including a clicker arrangement between said housing and said spool for resisting free turning of the latter on said sleeve shaft, said clicker arrangement comprising:

(1) a plurality of indentations arranged in annular array on said spool;

(2) a stud shaft pivotally mounted on said gear housing;

(3) a lever secured to the outside end of said stud shaft;

(4) a spring loaded bead mounted on the inner end of said stud shaft for movement into and out of the engagement with the indentations by manipulation of said lever;

(5) a hand crank exteriorly of said gear housing for turning said gear arrangement; and (6) means on said hand crank for engaging said lever during retrieval turning of said crank for automatically manipulating said lever therewith for moving said spring loaded bead on the stud shaft out of the engagement with the indentations.

* * * * *

UNITED STATES PATENT OFFICE
CERTIFICATE OF CORRECTION

Patent No. 4,106,717     Dated August 15, 1978

Inventor(s) Ralph Thiel

It is certified that error appears in the above-identified patent and that said Letters Patent are hereby corrected as shown below:

Delete sheet 3 of the drawings and insert the attached sheet.

Signed and Sealed this

Twenty-seventh Day of March 1979

[SEAL]

Attest:

RUTH C. MASON
Attesting Officer

DONALD W. BANNER
Commissioner of Patents and Trademarks